United States Patent
Snaith

(10) Patent No.: US 10,246,156 B2
(45) Date of Patent: Apr. 2, 2019

(54) AUDIBLE WARNING DEVICE FOR A BICYCLE

(71) Applicant: VELO SCIENTIFIC INC., Toronto (CA)

(72) Inventor: David Bryant Snaith, Toronto (CA)

(73) Assignee: VELO SCIENTIFIC INC., Toronto (CA)

( * ) Notice: Subject to any disclaimer, the term of this patent is extended or adjusted under 35 U.S.C. 154(b) by 0 days.

(21) Appl. No.: 15/248,761

(22) Filed: Aug. 26, 2016

(65) Prior Publication Data
US 2017/0057580 A1 Mar. 2, 2017

(51) Int. Cl.
*B62J 3/00* (2006.01)
*G08B 3/10* (2006.01)

(52) U.S. Cl.
CPC . *B62J 3/00* (2013.01); *G08B 3/10* (2013.01)

(58) Field of Classification Search
CPC ....... G08B 3/10; B62J 3/00; B62J 6/16; B62J 2099/0006; B62J 2099/0033; B62J 2700/636; B62M 25/04; B62K 23/02; B62K 11/14
USPC .......... 340/432; 116/164, 155, 158; 381/386
See application file for complete search history.

(56) References Cited

U.S. PATENT DOCUMENTS

| | | | |
|---|---|---|---|
| 5,083,108 A * | 1/1992 | Guest | B62J 3/00 340/384.6 |
| 5,777,554 A * | 7/1998 | Lehmann | G08B 13/1436 340/527 |
| 6,981,413 B2 * | 1/2006 | Kinoshita | B62J 99/00 340/432 |
| 7,995,787 B2 | 8/2011 | Ierfone et al. | |
| 2009/0192673 A1 * | 7/2009 | Song | B62K 21/08 701/37 |
| 2011/0115614 A1 * | 5/2011 | Huang | B60Q 1/2665 340/432 |
| 2012/0247854 A1 | 10/2012 | Kyoden | |

FOREIGN PATENT DOCUMENTS

EP 2423083 A1 2/2012
NL 1034366 C1 3/2009

* cited by examiner

*Primary Examiner* — Anh V La
(74) *Attorney, Agent, or Firm* — Bereskin & Parr LLP/S.E.N.C.R.L., s.r.l.; Isis E. Caulder; Nicholas Aitken

(57) ABSTRACT

An audible warning device for a bicycle including a steerer column. The audible warning device comprises one or more sound generating components; a housing adapted to house at least one of the one or more sound generating components; and a mounting component for securing the housing to the steerer.

10 Claims, 10 Drawing Sheets

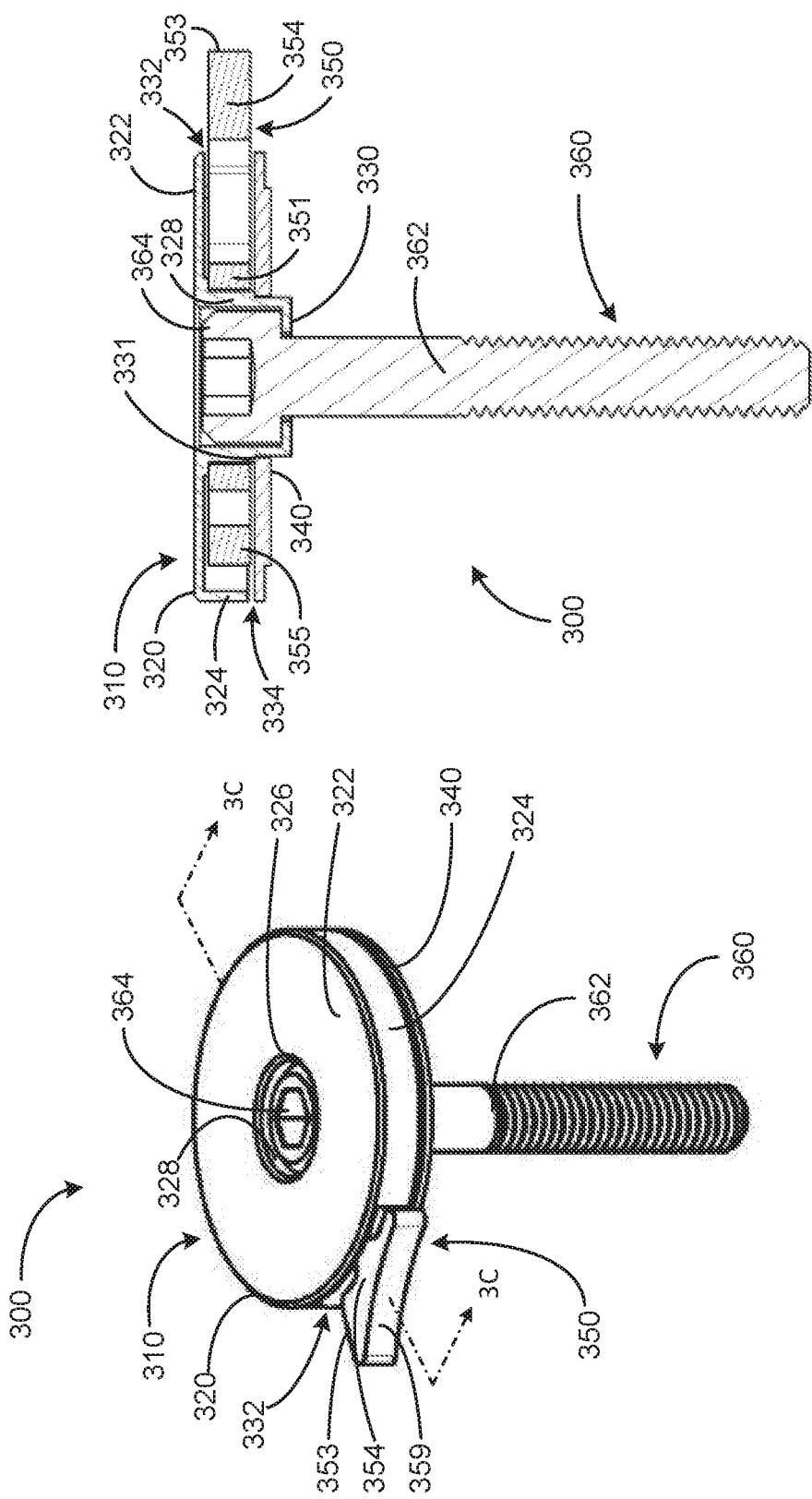

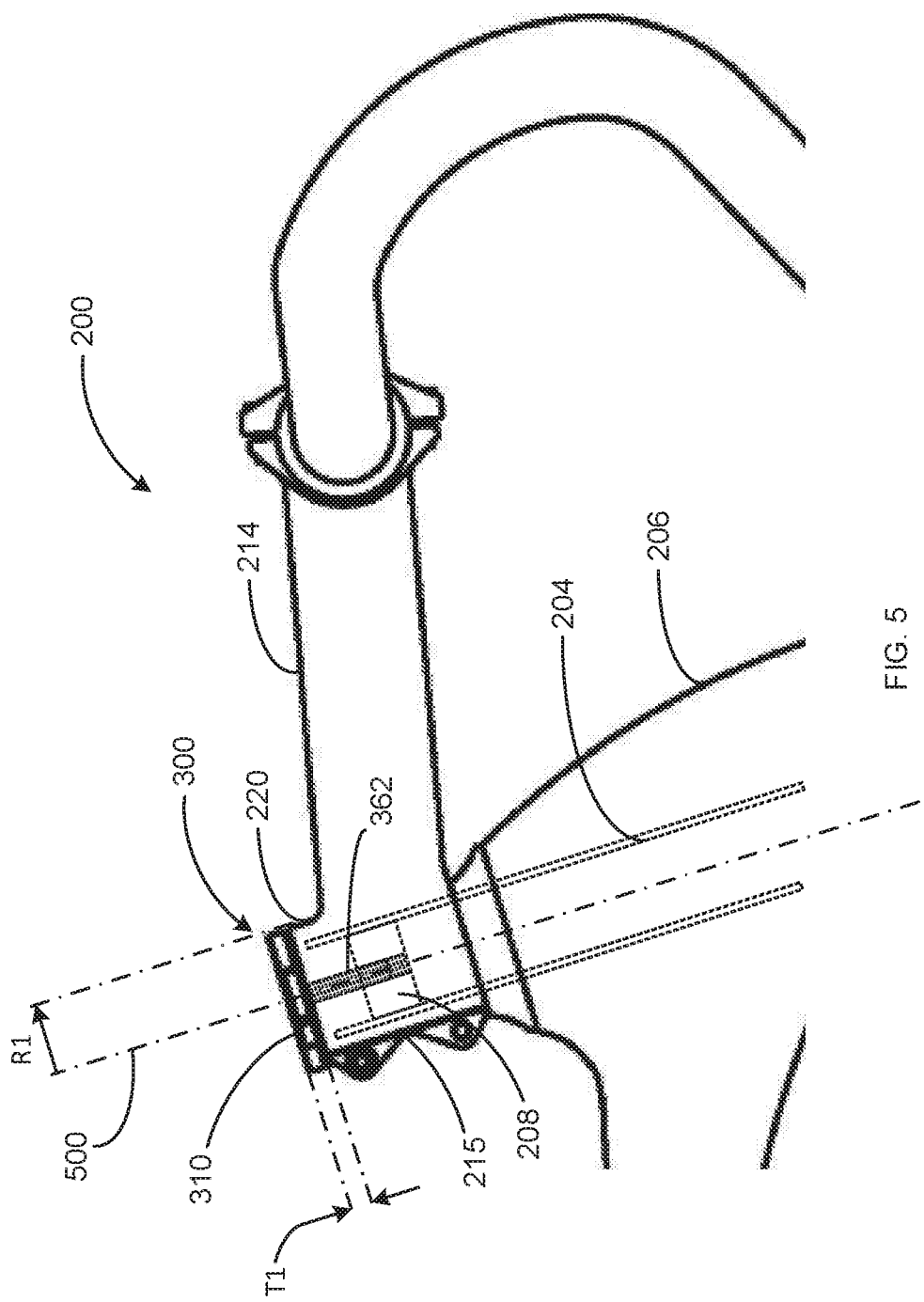

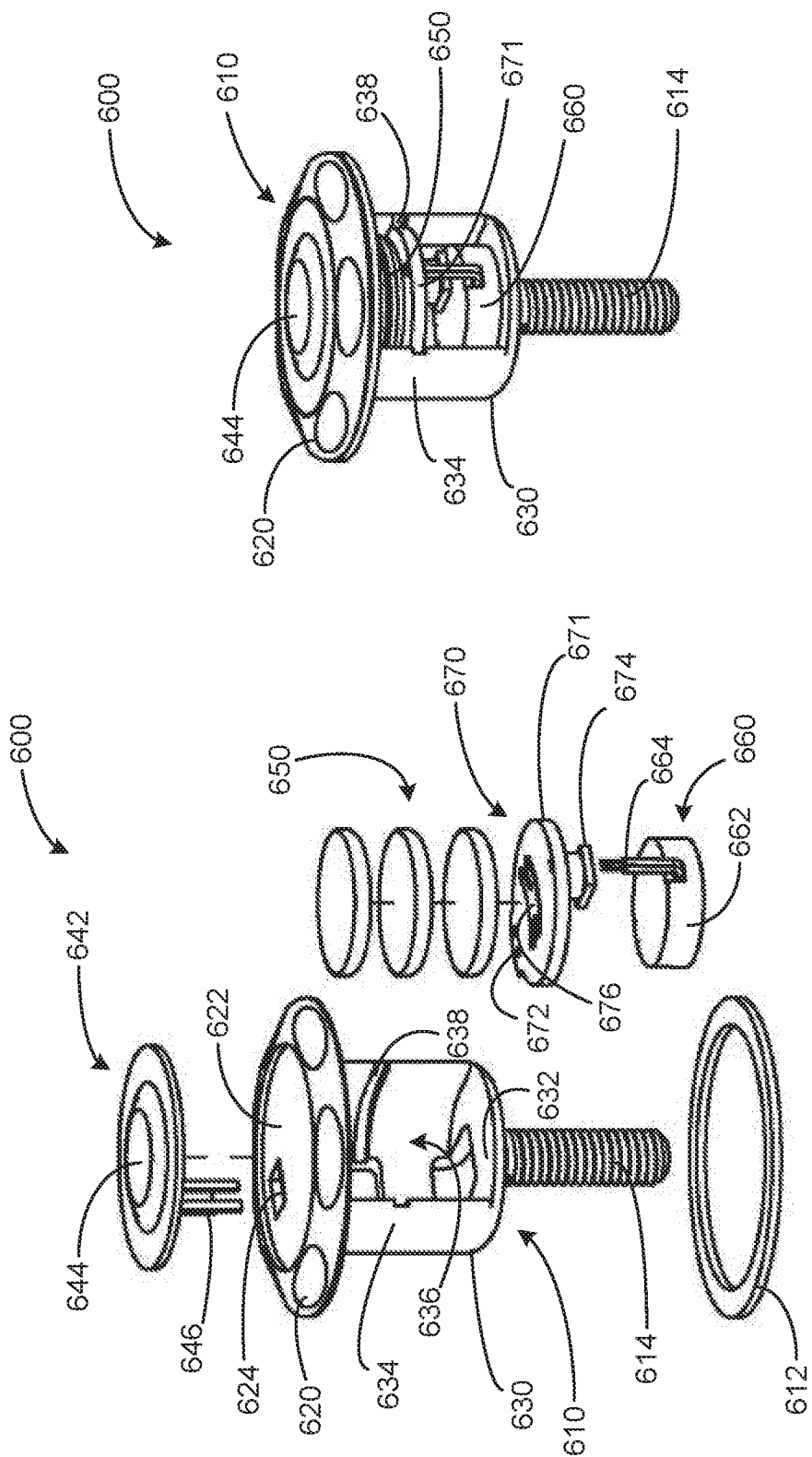

AUDIBLE WARNING DEVICE FOR A BICYCLE

FIELD

The described embodiments relate to an audible warning device for a bicycle, and more particularly, to a low-profile audible warning device adapted to be installed on a bicycle in place of the bicycle's headset top cap.

BACKGROUND

Existing bicycle audible warning devices, such as bells, are generally designed to be mounted to the handlebars of a bicycle. Such devices are often visually obtrusive and compromise the aesthetics of the bicycle. Apart from their obtrusive visual appearance, the devices are often bulky and add unnecessary weight to the bicycle.

Cycling enthusiasts often prefer not to add unnecessary weight to their bicycles, or have the aesthetically pleasing clean lines of their bicycle ruined by accessories that protrude from the bicycle's handlebars or frame. As a result, many cyclists prefer not to install an audible warning device on their bicycles. However, laws in many jurisdictions require that bicycles have one installed, and many cyclists who choose not to install one are fined for violating such laws.

Accordingly, there is a need for a bicycle audible warning device that is light weight, and has a low, visually unobtrusive profile, such that cyclists do not have to compromise the aesthetics or weight of their bicycles to comply with laws requiring an audible warning device to be installed on bicycles.

SUMMARY

In accordance with a first embodiment described herein, there is provided an audible warning device for a bicycle including a steerer column. The device can include one or more sound generating components, a housing adapted to house the sound generating component(s), and a mounting component for securing the housing to the steerer column.

Further aspects and advantages of the embodiments described herein will appear from the following description taken together with the accompanying drawings.

BRIEF DESCRIPTION OF THE DRAWINGS

Preferred embodiments of the present invention will now be described in detail with reference to the drawings, in which:

FIG. 3C is a isometric view of the audible warning device of FIG. 3A;

FIG. 3D is a section view of the audible warning device of FIG. 3A taken along lines 3C-3C of FIG. 3C;

FIG. 5 is a side view of the audible warning device of FIG. 3A installed on the front set of the bicycle of FIG. 1;

FIG. 6A is an assembly view of an audible warning device according to another embodiment of the present invention;

FIG. 6B is a isometric view of the audible warning device of FIG. 6A;

Figure 1:
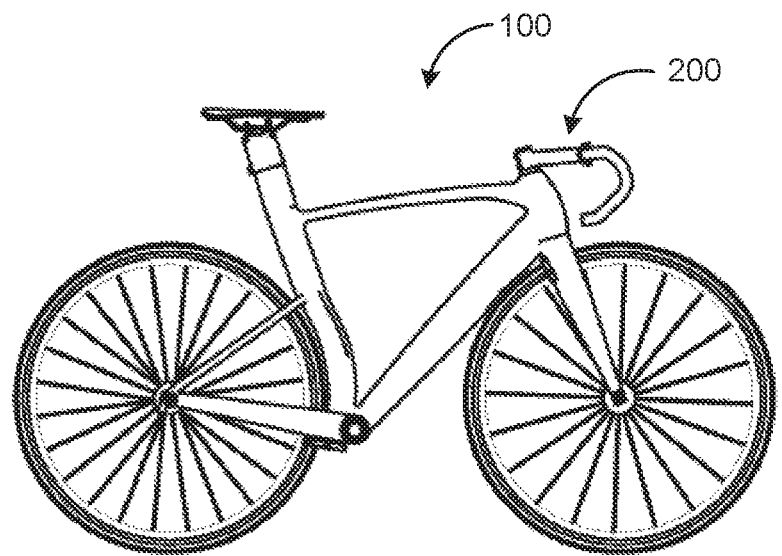
FIG. 1 is a side view of a bicycle having a front set on which an audible warning device according to an embodiment of the present invention can be installed.

The skilled person in the art will understand that the drawings, described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures, and components have not been described in detail so as not to obscure the embodiments described herein. Furthermore, this description is not to be considered as limiting the scope of the embodiments described herein in any way, but rather as merely describing the implementation of the various embodiments described herein.

Figure 2:
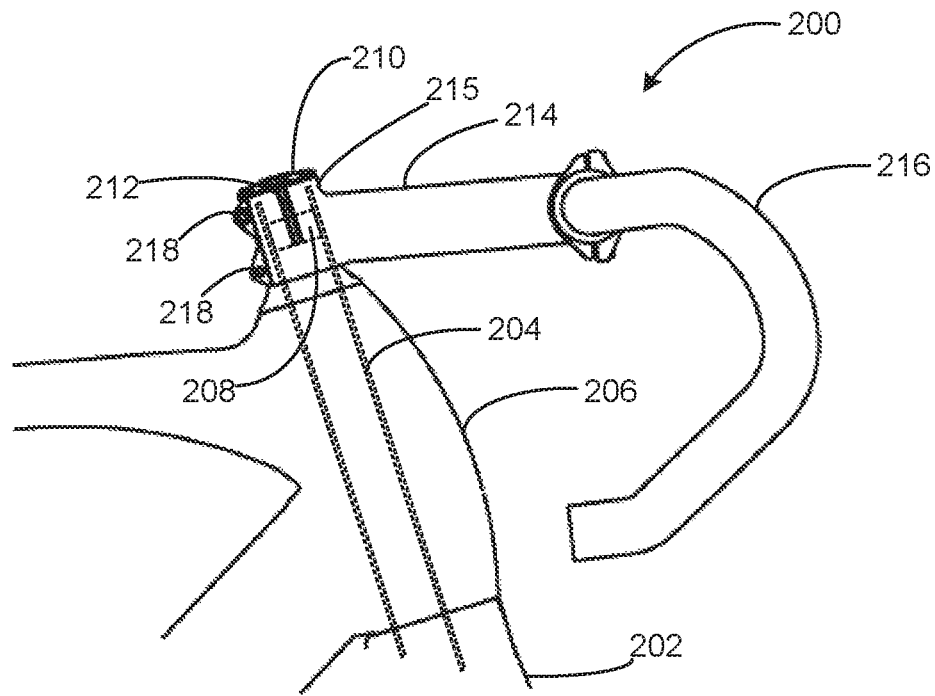
FIG. 2 is a side view of the front set of the bicycle of FIG. 1.

Reference is made to FIGS. 1 and 2, which show a typical bicycle 100 having a threadless fork configuration, and its front set 200, respectively. Front set 200 includes fork 202, steerer column 204, head tube 206, tapped anchor component 208, headset top cap 210, top-cap bolt 212, stem 214, and handlebars 216. Front set 200 can include additional headset components disposed within head tube 206, such as upper and lower headset bearings (not shown).

As will be appreciated by those skilled in the art, to assemble front set 200, the upper and lower headset bearings are placed within the upper and lower ends, respectively, of head tube 206. Steerer column 204, which is secured to and extends from the top of fork 202, is inserted into the lower end of head tube 206, passes through the lower and upper headset bearings, and extends from the upper end of head tube 206.

Stem 214 has a substantially cylindrical collar 215 that is concentrically slid over the portion of steerer column 204 extending from the upper end of head tube 206. Prior to securely clamping collar 215 to the steerer column 204 by tightening pinch bolts 218, top cap 210 is placed over the top of collar 215, and top-cap bolt 212 is inserted through an opening of top cap 210 into steerer column 204. Top-cap bolt 212 fastens the top cap 210 to collar 215 and stem 214 by being screwed into anchor component 208, which is secured within the upper portion of steerer column 204.

Next, the upper and lower headset bearings are preloaded by tightening top-cap bolt 212. Tightening top-cap bolt 212 results in fork 202 being pulled up against the lower headset bearing, and top cap 210 being pressed down on collar 215, which then presses down on the upper headset bearing. Once the upper and lower headset bearings are adequately preloaded, pinch bolts 218 are tightened to securely clamp collar 215 to steerer column 204.

Once the correct bearing preload is locked in by securing collar 215 to steerer column 204, top cap 210 is generally left in place to prevent dirt or rain from entering the steerer column 204 and fork 202. However, as will be appreciated by those skilled in the art, after the correct preload is locked in, top-cap bolt 212 and top cap 210 can be removed without affecting the functional aspects of bicycle 100. Aspects of the present invention are directed to a low-profile and visually unobtrusive audible warning device for a bicycle adapted to be installed on bicycle 100 in place of top cap 210.

Reference is made to FIGS. 3A to 3D, which show an audible warning device for a bicycle according to one embodiment of the present invention. Audible warning device 300 includes a housing 310 consisting of an upper housing portion 320 and a lower housing portion 340; a striking component 350 disposed within housing 310 for generating a sound by striking upper housing portion 320; and a mounting component 360 for securing the components of audible warning device 300 to steerer column 204. The mounting component 360 may include a top portion 364 and a length 362. In the example of FIGS. 3A to 3D, the mounting component 360 is a bolt. In other examples, the mounting component 360 may comprise any other well-known device, devices or methods using which the audible warning device 300 may be secured to the steerer column 204.

In some examples, audible warning device 300 may be secured to the steerer column 204 of bicycle 100 in place of top cap 210. In other examples, audible warning device 300 may be secured to steerer columns 204 that are not specifically adapted to have the top cap 210 secured thereto. While in many examples the steerer column 204 is adapted to include the top cap 210 secured thereto, the steerer column 204 need not be so adapted. So long as a given steerer column (not shown) includes a component, such as the anchor component 208, suitable to receive the mounting component 360, the audible warning device 300 may be secured to the given steerer column (not shown). A special steerer column (not shown) may, in fact, be adapted to have one or more embodiments of the audible warning device 300 secured thereto. The characteristics of the audible warning device 300 described in this paragraph are true for all embodiments of the audible warning device 300 described in this application.

Figure 3A:
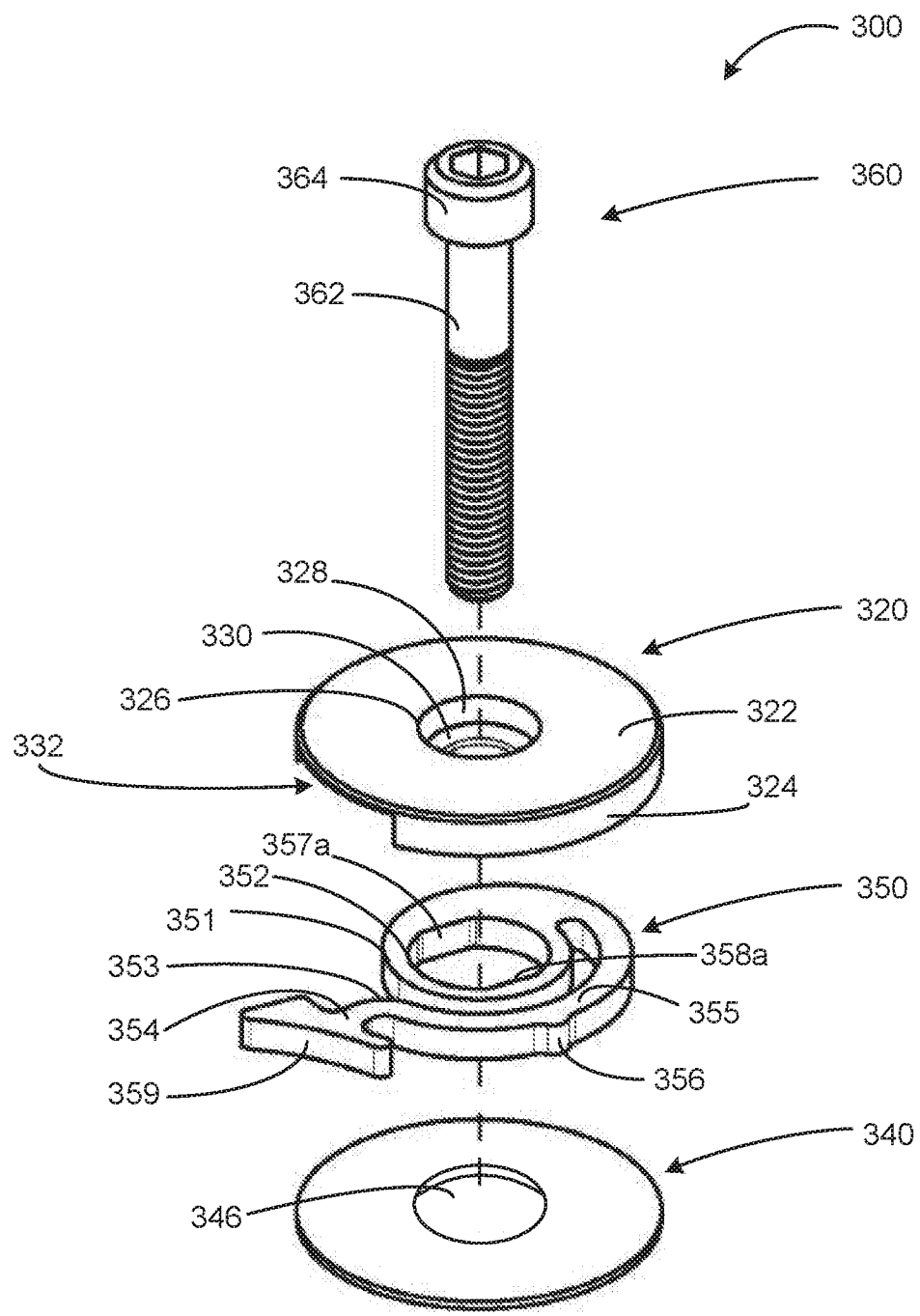
FIG. 3A is an assembly view of an audible warning device according to one embodiment of the present invention.
Figure 3B:
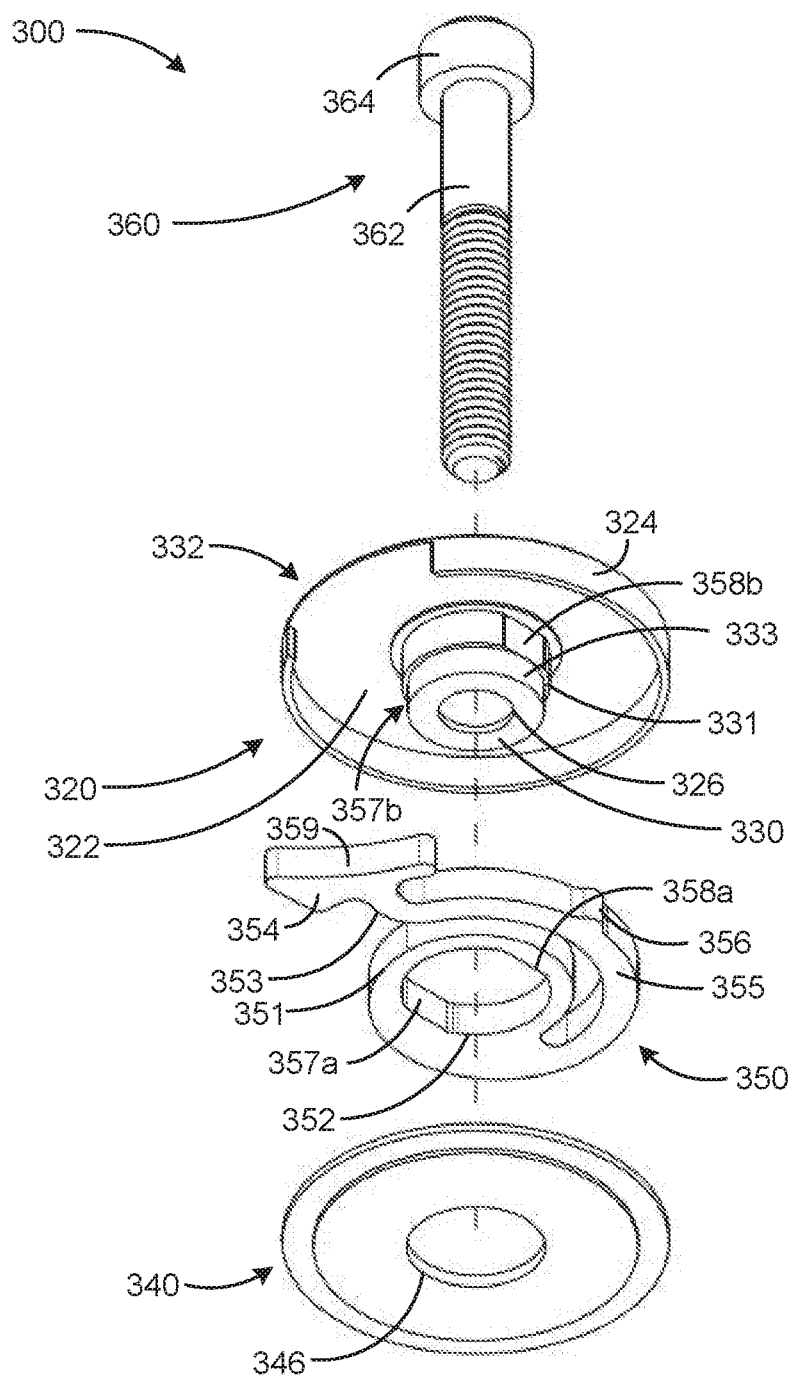
FIG. 3B is an inverted assembly view the embodiment of the present invention shown in FIG. 3A.

Still referring to the examples of audible warning device 300 shown in FIGS. 3A to 3D, upper housing portion 320 is substantially cylindrical in shape, with a planar circular top portion 322 and an outer sidewall 324 extending downwardly from the outer periphery of top portion 322. Top portion 322 has a circular opening 326 extending through its center, through which mounting component 360 extends. Upper housing portion 320 also has a cylindrical inner sidewall 328 extending downwardly from the periphery of opening 326. A circular flange 330 extends inwardly from the bottom of inner sidewall 328 toward the central axis of upper housing portion 320 (as best shown in FIGS. 3A, 3B and 3D). The outer surface 333 of sidewall 328 comprises a shoulder 331 defined in the perimeter of the outer surface 333. Shoulder 331 is adapted to press down on the lower housing portion 340 when the audible warning device 300 is assembled.

Although upper housing portion 320 is illustrated as being substantially cylindrical in shape, it will be appreciated that in other embodiments, upper housing portion 320 may be another shape, for example, a dome, and may also comprise multiple shapes, for example, dome shape elements and cylindrical shape elements.

Lower housing portion 340 is substantially disc shaped and has a diameter corresponding to that of upper housing portion 320. A circular opening 346 sized to receive outer surface 333 is defined in the center of lower housing portion 340.

Both upper housing portion 320 and lower housing portion 340 can be made from titanium. It should be understood, however, that other types of suitable metals or other materials (such as a brass, a bronze, an aluminum alloy, or a stainless steel) capable of accommodating the functions of housing 310 and audible warning device 300 described herein may be used.

Striking component 350 has a generally planar spiral shape, and consists of proximal portion 351 and distal portion 353. Proximal portion 351 has a generally cylindrical shape with a generally cylindrical opening 352 extending through its center. When the audible warning device 300 is assembled, striking component 350 is rotationally fixed relative to upper housing portion 320. In the current embodiment, proximal portion 351 defines two flat surfaces 357a, 358b in cylindrical opening 352. The upper housing portion 320 defines two corresponding flat surfaces 357b, 358b adapted to engage surfaces 357a and 375b and thereby rotationally fix striking component 350 relative to upper housing portion 320.

A person skilled in the art will appreciate that other methods of rotationally fixing striking element 350 relative to the upper housing portion 320 (such as providing matching pairs of grooves and slots, welding, using an adhesive, or 3D-printing housing portion 320 and lower housing portion 340 as a single structure) can be substituted without altering the functions of audible warning device 300. The current embodiment shows flat surface pairs 357a and 358a, and 357b and 358b as being directly opposite to each other. However, it will be appreciated that the flat surfaces need not directly oppose each other—for example, if six matching flat surface pairs are provided, they may be arranged hexagonally.

Distal portion 353 has a head 354 and elongated neck 355. Neck 355 extends away from a side of proximal portion 351 and spirals outwardly approximately 180 degrees around proximal portion 351 to head 354. Head 354 extends from neck 355 in a direction away from proximal portion 351 and has a generally hammer-like shape with an outwardly facing concave surface 359. As shown in FIGS. 3A and 3B, neck 355 can have a rounded protrusion 356 extending from its outwardly facing surface near its midsection.

Striking component 350 can be made from a rigid, elastically deformable material such as a polycarbonate. Such a material can allow distal portion 353 to be manipulated relative to proximal portion 351 from a rest position, in which distal portion 353 is spaced apart from proximal portion 351, into a biased position, in which distal portion 353 is adjacent to proximal portion 351. As a result of being elastically deformable, when released from the biased position, distal portion 353 snaps back into its rest position.

In one aspect, striking component 350 can be made from a clear polycarbonate material to make portions of striking component 350 that extend from housing 310 less visible. It should be understood, however, that other types of suitable materials (such as an aluminum alloy or a stainless steel alloy) capable of performing the functions of striking component 350 described herein may be used.

As best shown in FIGS. 3C and 3D, when audible warning device 300 is assembled, proximal portion 351 and neck 355 of striking component 350 are disposed within housing 310. Inner sidewall 328 of upper housing portion 320 extends through opening 352 of proximal portion 351.

Head 354 of striking component 350 extends out of upper housing portion 320 through opening 332 of outer sidewall 324, and is disposed in a rest position in which it does not contact outer sidewall 324. Both upper housing portion 320 and striking component 350 are supported on lower housing portion 340. The length 362 of mounting component 360 extends through openings 326, 346 of housing 310, whereas the underside of a top portion 364 of mounting component 360 rests on circular flange 330 of inner sidewall 328.

To generate a sound, a user can place a finger on concave surface 359 of head 354 of striking component 350 to pull head 354 rearward, in order to manipulate distal portion 353 from its rest position into a biased position. Upon being released from the biased position, distal portion 353 can strike the outer sidewall 324 of upper housing portion 320 before returning to its rest position. More specifically, in one aspect, protrusion 356 of neck 355 can strike the inner surface of outer sidewall 324. As a result of being struck, upper housing portion 320 may resonate, resulting in a sound being generated.

As best shown in FIG. 3D, in one aspect, upper housing portion 320 can be configured such that gap 334 is provided between the bottom of outer sidewall 324 and lower housing portion 340. Providing gap 334 may improve the resonance characteristics of upper housing portion 320, which may result in a louder sound being generated in response to upper housing portion 320 being struck by striking component 350.

Figure 4B:
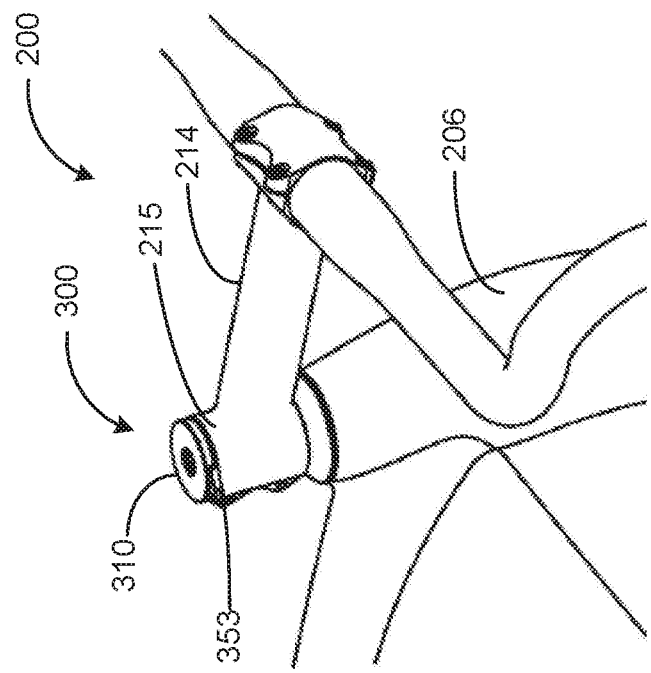
FIG. 4B is a isometric view of the audible warning device of FIG. 3A installed on the front set of the bicycle of FIG. 1.
Figure 4A:
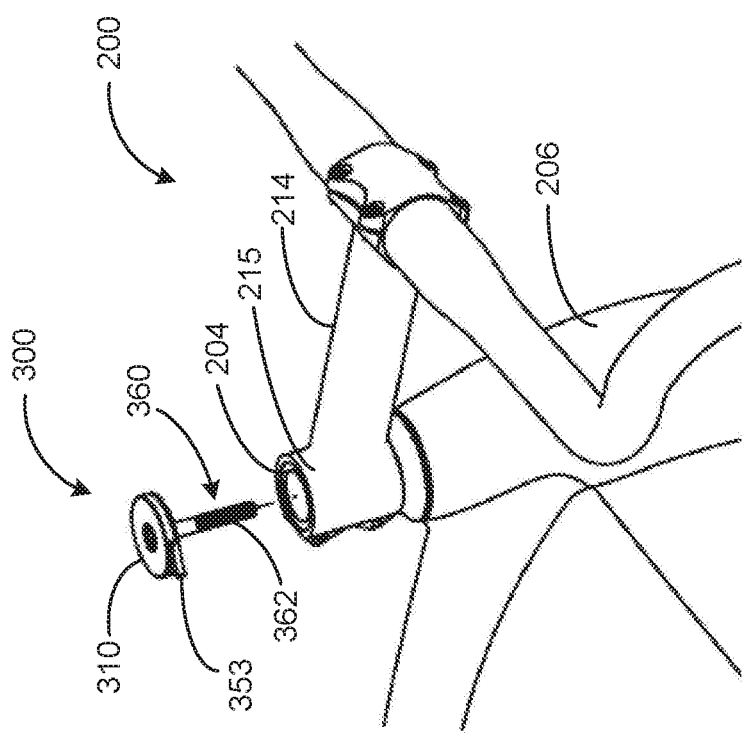
FIG. 4A is an assembly view of the audible warning device of FIG. 3A being installed on the front set of the bicycle of FIG. 1.

Referring now to FIGS. 4A, 4B, and 5, front set 200 is shown with top cap 210 removed. With top cap 210 removed, audible warning device 300 can be installed in place of top cap 210 (as best shown in FIGS. 4B and 5), by placing housing 310 on top of collar 215, such that the length 362 of mounting component 360 extends through housing 310 and into steerer column 204. Mounting component 360 can then be secured to anchor component 208 disposed within steerer column 204 (as shown in FIG. 5). The mounting component 360 of the example audible warning device 300 shown in FIGS. 4A, 4B, and 5 comprises a bolt. The bolt is secured to the anchor component 208 by being screwed into the anchor component 208. As mounting component 360, in this example the bolt, is tightened, the underside of the top portion 364 of mounting component 360 presses down on circular flange 330 of upper housing portion 320. In turn, the shoulder 331 defined in the perimeter of the outer surface 333 presses down on lower housing portion 340. The outer periphery of lower housing portion 340 then presses against the top of collar 215, resulting in audible warning device 300 being securely fastened to steerer column 204.

As will be appreciated, as a result of the design of housing 310 and striking component 350, audible warning device 300 can be installed for either left or right handed cyclists.

It will be further appreciated that in some embodiments, audible warning device 300 can be configured to use top-cap bolt 212 to fasten audible warning device 300 to steerer column 204.

As best shown in FIG. 5, when installed, audible warning device 300 has a low, visually unobtrusive profile, similar to that of top cap 210. In one aspect, housing 310 can have a thickness T1 of less than 30 mm measured along a longitudinal axis 500 running through the center of steerer column 204. In the preferred embodiment shown in FIG. 5, thickness T1 is less than 10 mm.

In a further aspect, housing 310 can be retained substantially within a circular boundary defined by a radius R1. In one embodiment, radius R1 can extend orthogonally from longitudinal axis 500 to less than 20 mm past outer surface 220 of collar 215. In the preferred embodiment shown in FIG. 5, radius R1 extends orthogonally from the longitudinal axis 500 to outer surface 220 of collar 215.

Reference is now made to FIGS. 6A and 6B, which show an audible warning device for a bicycle according to another embodiment of the present invention. Bicycle audible warning device 600 includes housing 610, annular rubber gasket 612, threaded rod 614, and electronic sound generating components including actuator switch 642, battery cells 650, electronic sound generator 660, and electronic circuit 670. Circuit 670 can be a conventional circuit that includes a standard disc-shaped circuit board 671 adapted to provide a signal to sound generator 660 to generate a sound in response to switch 642 being activated.

Switch 642 is also disc shaped and can be a conventional push button switch which is biased into an open position, and which can be closed in response to button 644 being pressed. Electrical prongs 646 of switch 642 can be connected to contacts 672 of circuit board 671, to electrically connect switch 642 to circuit 670.

Sound generator 660 can be a conventional disc-shaped piezoelectric speaker that includes a standard piezoelectric wafer (not shown) disposed within sound-reinforcing chamber 662. Wires 664 of sound generator 660 can be connected to contacts 674 of circuit board 671, to electrically connect sound generator 660 to circuit 670.

Battery member 650 provides power to the sound generator 660 and circuit 670. In the present embodiment, battery member 650 comprises three interconnected batteries and is disposed on top of contact 676 of circuit board 671 to electrically connect battery member 650 to circuit 670. A person skilled in the art will understand that battery member 650 can comprise one or multiple interconnected batteries and one or multiple battery cells. The person will further appreciate that battery member 650 can be any device capable of powering sound generator 660 and need not be disposed within housing 610.

The present invention contemplates multiple embodiments of sound generator 660 and circuit 670. The specifications (such as sound pressure output and beep frequency) of each embodiment can be dictated by such minimum sound generation requirements for bicycle audible warning devices as may be stipulated in the laws of each jurisdiction for which the present invention is intended.

Housing 610 consists of upper housing portion 620 and lower housing portion 630. Lower housing portion 630 is substantially cylindrical in shape with a circular base 632 and sidewall 634 extending upwards from the periphery of base 632 to upper housing portion 620. Base 632 and sidewall 634 are sized to slide concentrically into steerer column 204. Sidewall 634 has an opening 636 through which battery cells 650, sound generator 660, and circuit 670 can be inserted into the interior of lower housing portion 630 to be housed therein. The inner surface of sidewall 634 has a concentric groove 638 near its midsection for receiving and securing circuit board 671.

Threaded rod 614 extends downwardly from the center of the exterior surface of base 632. In one embodiment, rod 614 can be formed integrally with housing 610. In another embodiment, rod 614 can be a bolt having a head fixed within the interior of lower housing portion 630, and a length extending through an opening in base 632.

Upper housing portion 620 is substantially disc shaped and has a diameter larger than that of lower housing portion 630, resulting in upper housing portion 620 extending radially past the outer surface of sidewall 634 of lower housing portion 630. Gasket 612 slides concentrically around lower housing portion 630 and is disposed against the exterior underside of upper housing portion 620. Housing 610 can be made from any material capable of accommodating the functions of the audible warning device 600 described herein. For example, housing 610 can be molded from one or more thermoplastics, including, but not limited to, a glass filled polyoxymethylene. In one particular example, the housing is molded from Delrin 570.

As shown in FIG. 6B, when audible warning device 600 is assembled, sound generator 660 is disposed on the inner surface of base 632 of lower housing portion 630. Circuit board 671 slides into and is held in place by concentric groove 638. Battery cells 650 are disposed on top of circuit board 671, and are held against contact 676 of circuit board 671 by the interior underside of upper housing portion 620. Switch 642 is disposed in a cylindrical recess 622 on the top surface of upper housing portion 620. Prongs 646 of switch 642 can extend into the interior of lower housing portion 630 through opening 624 in the base of cylindrical recess 622, to be connected to contacts 672 of circuit board 671.

Figure 6C:
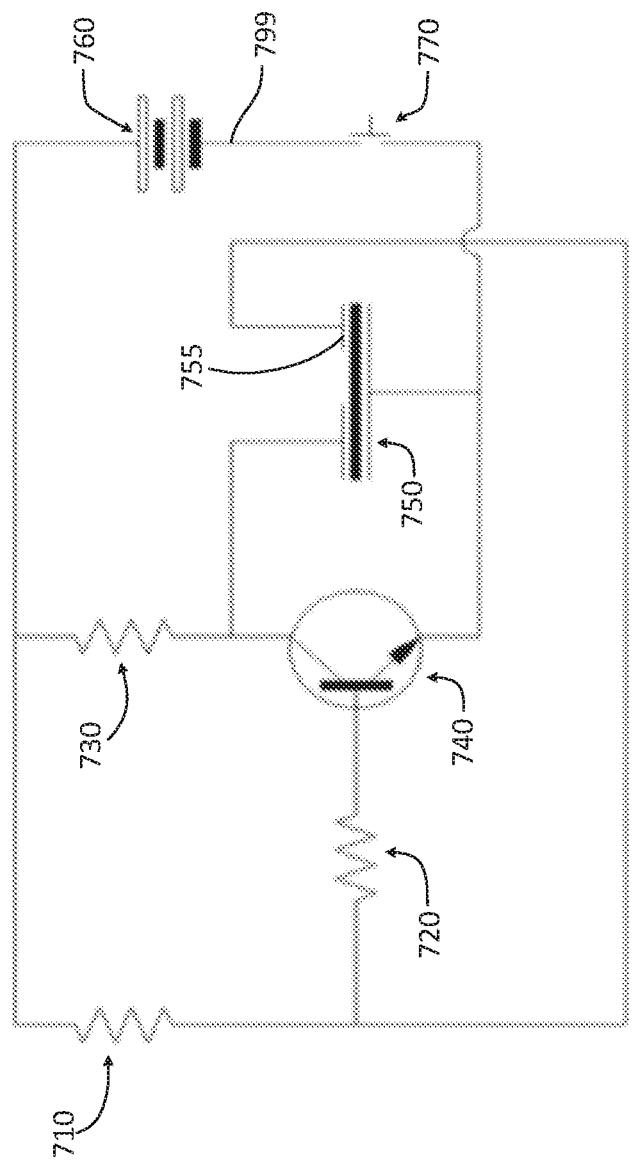
FIG. 6C is a circuit diagram for an embodiment of the circuit of FIG. 6A.

Reference is next made to FIG. 6C, where a circuit diagram for an embodiment of circuit 670 is disclosed. This particular embodiment of circuit 670 electrically oscillates a piezo element, which may be used in embodiments of the invention, for example, where sound generator 660 includes an appropriately configured piezo element. Nevertheless, the skilled practitioner will recognize that other circuits may be used as circuit 670, and that these other circuits may correspond to other embodiments of sound generator 660. Some examples of these other circuits include: "external drive" buzzer circuits (as opposed to "self drive" buzzer circuits that require a piezo element with a feedback terminal), electromechanical buzzer circuits, circuits including off-the-shelf components (including off-the-shelf buzzers), circuits involving alternative power sources (e.g. solar power), etc.

In this embodiment, circuit 670 consists of biasing resistor 710, biasing resistor 720, pull-up resistor 730, NPN transistor 740, piezo element 750 with feedback terminal 755, battery 760, and switch 770. When switch 770 is closed, a voltage is applied across piezo element 750 through pull-up resistor 730, causing piezo element 750 to deflect. As piezo element 750 deflects, it causes a small current to flow between feedback terminal 755 and the base of transistor 740, putting transistor 740 in a biased state. This allows current to flow through pull-up resistor 730 to ground 799, which lowers the voltage across piezo element 750 and causes piezo element 750 to relax. When piezo element 750 is relaxed, negligible current flows between feedback terminal 755 and the base of transistor 740, returning transistor 740 to an unbiased state. This restores the voltage across piezo element 750, causing it to deflect and a new cycle to begin. This repeated deflection (i.e. oscillation) of piezo element 750 will continue until switch 770 is opened. The oscillation of piezo element 750 effects sound.

The skilled practitioner will recognize that, in this embodiment of circuit 670, the components would be chosen so that piezo element 750 oscillates when switch 770 is closed. One possible configuration for this embodiment of circuit 670 includes: a 330 kΩ resistor as biasing resistor 710, a 2.2 kΩ resistor as biasing resistor 720, a 2.2 kΩ resistor as pull-up resistor 730, a 2N3904 transistor as NPN transistor 740, a 12V battery as battery 760, and a momentary contact push button as switch 770.

Figure 7B:
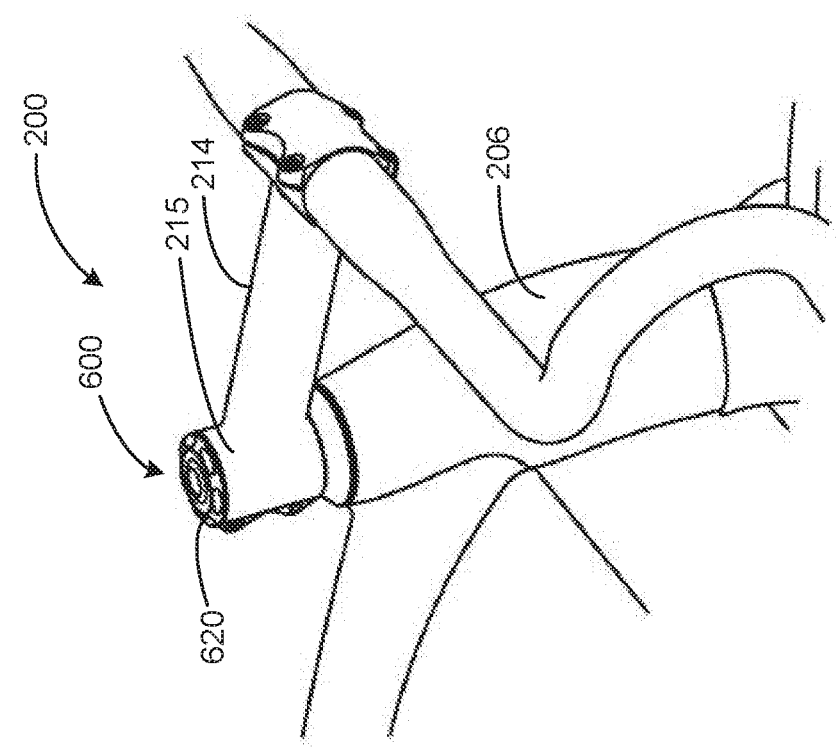
FIG. 7B is a isometric view of the audible warning device of FIG. 6A installed on the front set of the bicycle of FIG. 1.
Figure 7A:
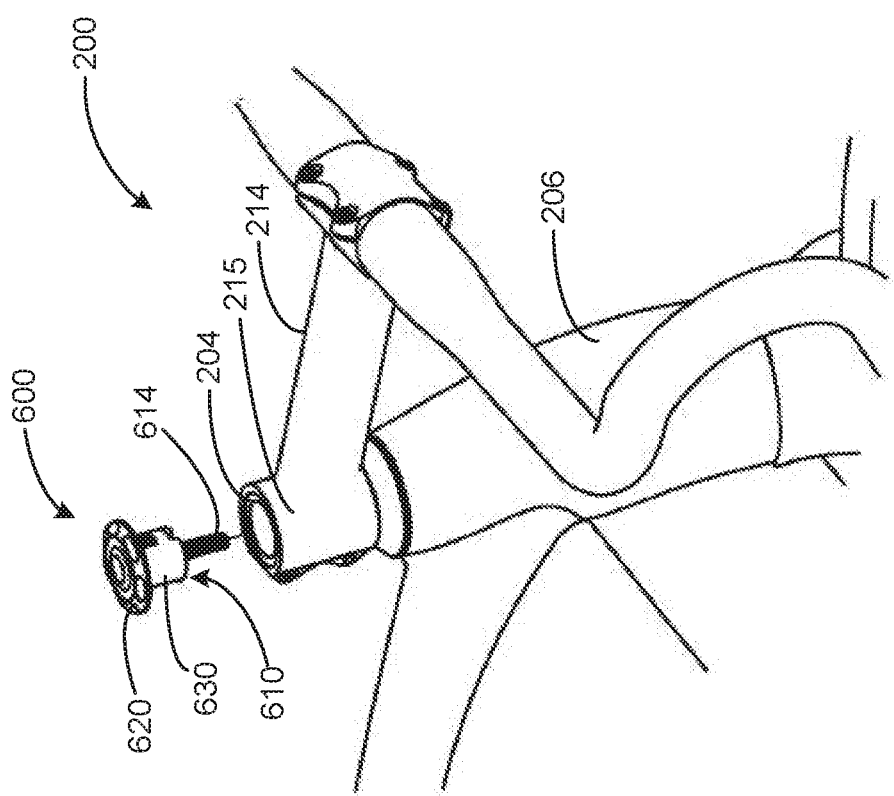
FIG. 7A is an assembly view of the audible warning device of FIG. 6A being installed on the front set of the bicycle of FIG. 1.
Figure 8:
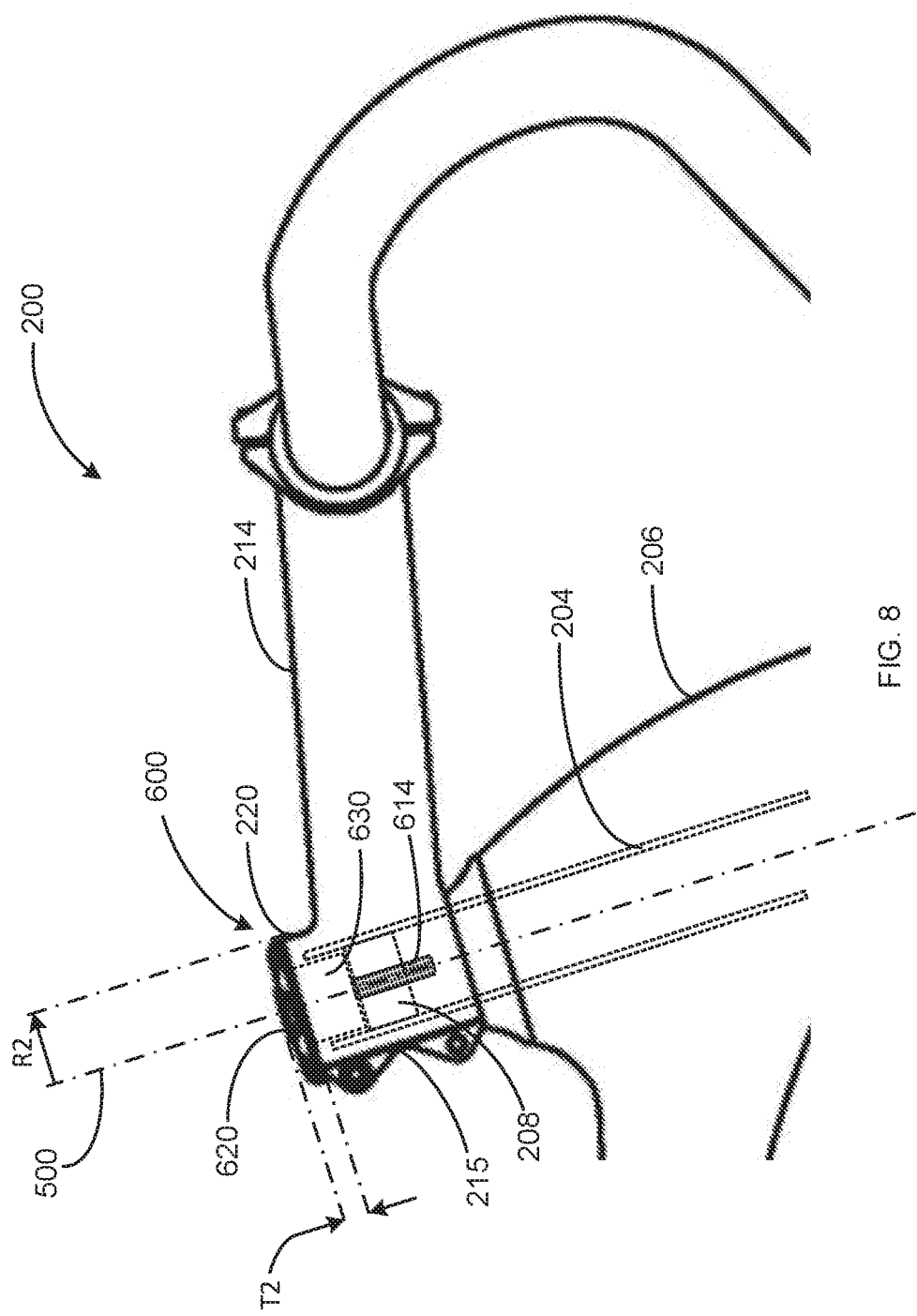
FIG. 8 is a side view of the audible warning device of FIG. 6A installed on the front set of the bicycle of FIG. 1.

Referring now to FIGS. 7A, 7B, and 8, front set 200 of bicycle 100 is shown with top cap 210 removed. With top cap 210 removed, audible warning device 600 can be installed in place of top cap 210 (as best shown in FIGS. 7B and 8) by sliding rod 614 and lower housing portion 630 into steerer column 204. Housing 310 can then be rotated, causing rod 614 to be screwed into anchor component 208 disposed within steerer column 204 (as shown in FIG. 8). As rod 614 is tightened, the exterior underside of upper housing portion 620 presses gasket 612 against the top of collar 215 of stem 214, resulting in audible warning device 600 being securely fastened to steerer column 204. It will be appreciated that gasket 612 can provide a water-tight seal between upper housing portion 620 and collar 215.

It will further be appreciated that when audible warning device 600 is installed, button 644 of switch 642 is accessible such that a user can activate switch 642 by pressing button 644, thereby causing sound generator 660 to emit a sound. It will further be appreciated that assembly 600 can be unscrewed from anchor component 208 and removed from bicycle 100 at any time, in order to, for example, replace battery cells 650.

As best shown in FIG. 8, when installed, audible warning device 600 has a low, visually unobtrusive profile, similar to that of top cap 210. As will be appreciated, lower housing portion 630 is retained within steerer column 204, and therefore is not visible to a user of bicycle 100. On the other hand, upper housing portion 620 rests on collar 215 and is therefore visible to a user of bicycle 100. In one aspect, the visible portion of housing 610 can have a thickness T2 of less than 10 mm measured along the longitudinal axis 500 running through the center of steerer column 204. In the preferred embodiment shown in FIG. 8, thickness T2 is less than 3 mm.

In a further aspect, upper housing portion 620 can be retained substantially within a circular boundary defined by a radius R2. In one embodiment, radius R2 can extend orthogonally from the longitudinal axis 500 to less than 20 mm past outer surface 220 of collar 215. In the preferred embodiment shown in FIG. 8, radius R2 extends orthogonally from the longitudinal axis 500 to outer surface 220 of collar 215.

The present invention has been described here by way of example only. Various modifications and variations may be made to these exemplary embodiments without departing from the spirit and scope of the invention, which is limited only by the appended claims.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. An audible warning device for a bicycle including a steerer column, the steerer column defining a longitudinal axis running through its center, the audible warning device comprising:
   a housing having a housing upper end;
   a striking component connected to the housing and adapted to generate a sound by striking the housing; and
   a mounting bolt extending longitudinally downwardly of the housing upper end for securing the housing to the steerer column,
wherein, when the housing is secured to the steerer column, the housing upper end extends above the steerer column along the longitudinal axis.

2. The audible warning device of claim 1, wherein:
   the steerer column is adapted to have a headset top cap secured thereto, and the mounting bolt is adapted to secure the housing to the steerer column in place of the top cap.

3. The audible warning device of claim 2, wherein the mounting bolt is a top-cap bolt.

4. The audible warning device of claim 1, wherein:
   the housing is shaped such that when secured to the steerer column, only a portion of the housing having a thickness T measured along the longitudinal axis extends above the steerer column, wherein the thickness T is less than 30 mm.

5. The audible warning device of claim 4, wherein the thickness T is less than 10 mm.

6. The audible warning device of claim 4, wherein the thickness T is less than 3 mm.

7. The audible warning device of claim 4, wherein:
   the bicycle further includes a stem having a substantially cylindrical collar through which the steerer column concentrically extends, and
   the housing is shaped such that when secured to the steerer column, the portion of the housing extending above the steerer column is retained substantially within a circular boundary defined by a radius R, wherein the radius R extends orthogonally from the longitudinal axis to less than 20 mm past an outer surface of the collar.

8. The audible warning device of claim 7, wherein the radius R extends orthogonally from the longitudinal axis to the outer surface of the collar.

9. The audible warning device of claim 1, wherein the striking component is elastically deformable and includes a proximal portion secured within the housing and a distal portion adapted to:
   be manipulated from a rest position into a biased position, and
   generate the sound by striking the housing when released from the biased position.

10. The audible warning device of claim 9, wherein when the housing is secured to the steerer column, the distal portion of the striking component extends outside of the housing and is accessible to be manipulated from the rest position into the biased position by a user of the bicycle.

* * * * *